(12) United States Patent
Misawa

(10) Patent No.: US 11,179,761 B2
(45) Date of Patent: Nov. 23, 2021

(54) METHOD OF MANUFACTURING PRESSED PRODUCT

(71) Applicant: TOYOTA BOSHOKU KABUSHIKI KAISHA, Aichi (JP)

(72) Inventor: Ryo Misawa, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 168 days.

(21) Appl. No.: 16/249,362

(22) Filed: Jan. 16, 2019

(65) Prior Publication Data

US 2019/0224737 A1 Jul. 25, 2019

(30) Foreign Application Priority Data

Jan. 23, 2018 (JP) .............................. JP2018-008774

(51) Int. Cl.
*B21D 22/02* (2006.01)
*B21D 5/01* (2006.01)
(Continued)

(52) U.S. Cl.
CPC .............. *B21D 22/02* (2013.01); *B21D 5/01* (2013.01); *B21D 19/082* (2013.01); *B21D 19/10* (2013.01);
(Continued)

(58) Field of Classification Search
CPC . B21D 22/02; B21D 5/01; B21D 5/16; B21D 19/08; B21D 19/082; B21D 19/10;
(Continued)

(56) References Cited

U.S. PATENT DOCUMENTS 4,233,833 A * 11/1980 Balinski ............... B21D 13/045
72/180
5,561,902 A * 10/1996 Jacobs ................... B62D 25/00
29/897.2
(Continued)

FOREIGN PATENT DOCUMENTS

| JP | H10506074 A | 6/1998 |
| JP | 2014108448 A | 6/2014 |
| JP | 5560798 | 7/2014 |

OTHER PUBLICATIONS

Notice of Reasons for Refusal in the counterpart Japanese patent application No. 2018-008774 dated Jun. 29, 2021, and machine-generated English translation thereof.

*Primary Examiner* — Adam J Eiseman
*Assistant Examiner* — Amer Islam
(74) *Attorney, Agent, or Firm* — Greenblum & Bernstein, P.L.C.

(57) ABSTRACT

Disclosed is an example of a method of manufacturing a pressed product including a substantially U-shaped main body and an undercut flange situated in the main body, in which an angle modification process can be eliminated. In the disclosed method, a third bent part, which is situated away from a first bent part towards a second bent part on a metallic sheet by a first length or more, is bent such that the first bent part is moved towards a first press direction and the undercut flange is moved towards a second press direction. The first press direction and the second press direction are opposite to each other. The first length is a length from a boundary between the undercut flange and a first plate portion to a tip of the undercut flange sized by projecting the undercut flange on an imaginary surface orthogonal to the first plate portion.

5 Claims, 6 Drawing Sheets

(51) Int. Cl.
  *B21D 19/10* (2006.01)
  *B21D 19/08* (2006.01)
  *B60N 2/68* (2006.01)
  *B21D 47/01* (2006.01)
  *B21D 53/88* (2006.01)

(52) U.S. Cl.
  CPC ............... *B21D 47/01* (2013.01); *B60N 2/68* (2013.01); *B21D 53/88* (2013.01)

(58) Field of Classification Search
  CPC ........ B21D 47/01; B21D 53/88; B21D 22/20; B21D 22/21; B21D 22/24; B60N 2/68
  See application file for complete search history.

(56) References Cited

U.S. PATENT DOCUMENTS

| | | | | |
|---|---|---|---|---|
| 2009/0293405 A1* | 12/2009 | Andrews | ................ | B21D 22/02 52/578 |
| 2015/0210196 A1* | 7/2015 | Yamamoto | ............. | B60N 2/682 297/452.18 |

* cited by examiner

METHOD OF MANUFACTURING PRESSED PRODUCT

CROSS-REFERENCE TO RELATED APPLICATIONS

This application claims the benefit of Japanese Patent Application No. 2018-008774 filed-on Jan. 23, 2018 in the Japan Patent Office, the entire disclosure of which is incorporated herein by reference.

BACKGROUND

The present disclosure relates to a method of manufacturing a pressed product.

As a method of manufacturing a pressed product that comprises an undercut flange (inwardly bent flange), for example, Japanese Patent No. 5560798 discloses that a flange molding process is carried out after completing a main body molding process.

In the main body molding process, a metallic sheet is pressed to mold a substantially U-shaped main body. In the flange molding process, an angle modification process is performed to change a holding angle of the metallic sheet that went through the main body molding process (hereinafter, referred to as a work), and then the work is pressed to mold an undercut flange.

The following is the reason for performing the angle modification process before molding the undercut flange.

In the press working, at least a first metallic mold and a second metallic mold are used to interpose and press a metallic sheet to mold the metallic sheet into a specified shape. For example, if the first metallic mold forms the inside of the main body, then the undercut flange is formed to protrude towards the first metallic mold.

Thus, the undercut flange cannot be molded by the first metallic mold and the second metallic mold. In addition, since the undercut flange is formed to protrude towards the first metallic mold, the metallic mold to mold the undercut flange (hereinafter, referred to as the third metallic mold) cannot be pressed onto the metallic sheet from the same direction as the direction to press the first metallic mold.

Accordingly, in the invention disclosed in the aforementioned patent, the undercut flange is molded by pressing the third metallic mold onto the work, as shown in FIG. 6, after the angle modification process is carried out.

SUMMARY

Preferably, the present disclosure provides a method of manufacturing a pressed product having an undercut flange on a substantially U-shaped main body, in which an angle modification process can be eliminated.

One aspect of the present disclosure is a method of manufacturing a pressed product comprising a substantially U-shaped main body and an undercut flange. The substantially U-shaped main body comprises a first plate portion and a second plate portion facing each other across a space, and a third plate portion coupling the first plate portion with the second plate portion and extending towards a direction orthogonal to a plate surface of the first plate portion and a plate surface of the second plate portion. The undercut flange extends from an end of the first plate portion towards the second plate portion. The end of the first plate portion is situated opposite from the third plate portion.

The method of manufacturing the pressed product comprises at least a flange molding process and a finishing process. The flange molding process comprises bending a metallic sheet due to a pressure applied to the metallic sheet in a thickness direction of the metallic sheet and molding the undercut flange. The flange molding process further comprises bending a first bent part, corresponding to a first border that is a boundary between the first plate portion and the third plate portion of the metallic sheet, and a second bent part, corresponding to a second border that is a boundary between the second plate portion and the third plate portion of the metallic sheet, to mold the first plate portion, the first border, the second plate portion, and the second border. The finishing process comprises finishing the pressed product by shaping the metallic sheet, molded in the flange molding process, into the pressed product.

In the flange molding process, a third bent part, which is situated away from the first bent part towards the second bent part on the metallic sheet by a first length or more, is bent such that the first bent part is moved towards a first press direction and the undercut flange is moved towards a second press direction. The first press direction and the second press direction are opposite to each other.

The first length is a length from a boundary between the undercut flange and the first plate portion to a tip of the undercut flange. The first length is sized by projecting the undercut flange on an imaginary surface orthogonal to the first plate portion.

Accordingly, the angle modification process can be eliminated from the method of manufacturing the pressed product.

The method of manufacturing the pressed product may also be as explained below.

The finishing process may comprise a flange reversing process to eliminate bent shape of the third bent part and mold the third bent part into a plane. This leaves a shock line at the third bent part on the pressed product.

The flange molding process may comprise at least a preflange molding process, in which the metallic sheet is bent to mold the undercut flange, and a boundary molding process, in which the first bent part is bent to mold the first border. The boundary molding process may be carried out after completing the preflange molding process. Accordingly, a person who manufactures the pressed product can certainly eliminate the angle modification process.

The flange molding process may comprise at least a flange bending process, in which the third bent part is bent. The flange bending process may be carried out after completing the preflange molding process.

Accordingly, a person who manufactures the pressed product can more certainly eliminate the angle modification process.

In this method, the flange bending process may also be carried out after completing the preflange molding process and before initiating the boundary molding process.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

Figure 1:
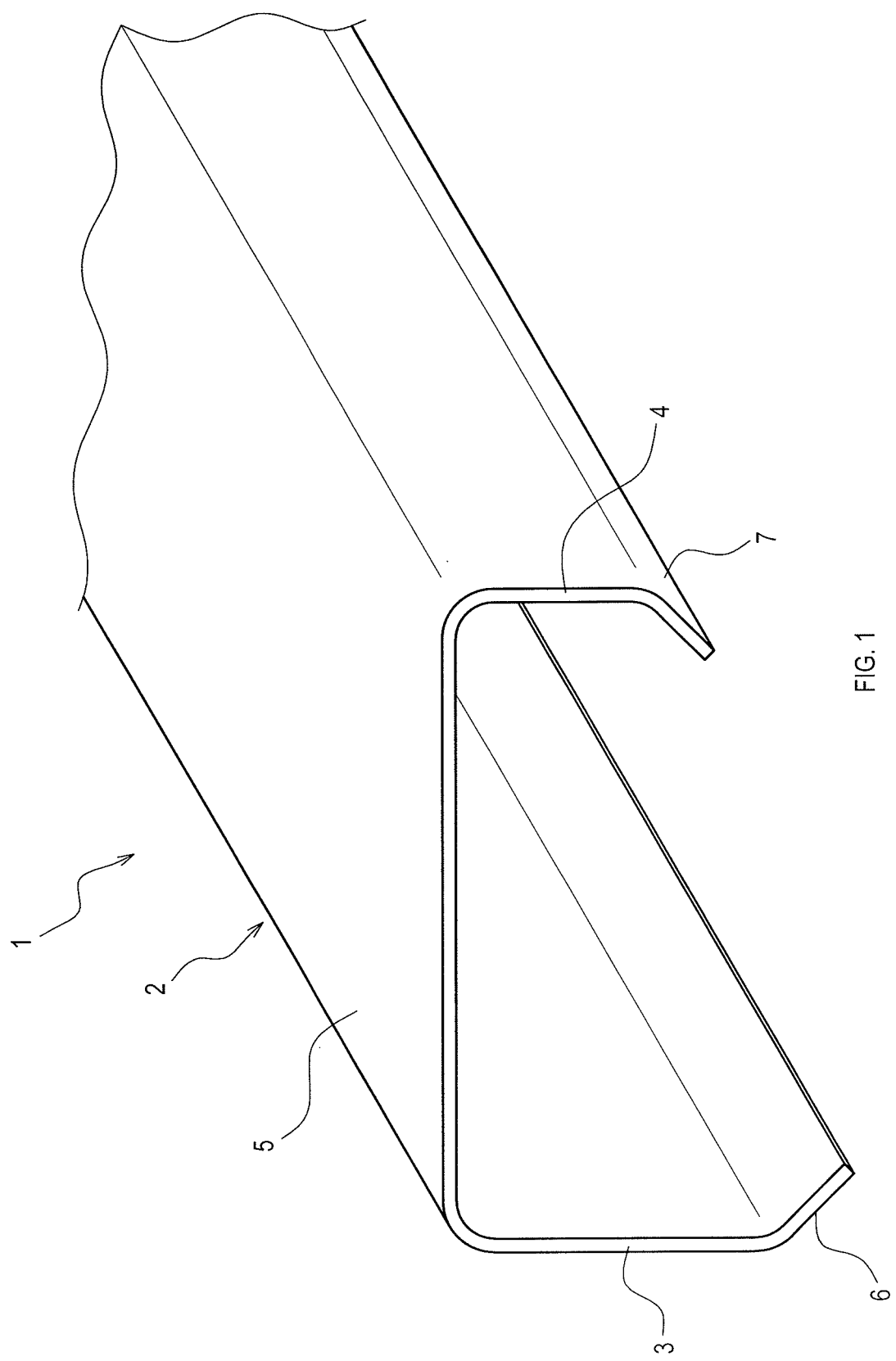
FIG. 1 is a diagram showing a frame according to an embodiment.

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

At least in respect of a member or portion that is labeled with a reference numeral for explanations, there may be at least one in number of such a member or portion unless the number is otherwise specified. In other words, there may be two or more of such a member or portion when the number is not specified.

The present embodiment is a method of manufacturing a frame that is used for a seat installed in a vehicle such as an automobile (hereinafter, referred to as a vehicle seat). Arrows and other marks that indicate directions on each drawings are made for easy understanding of relationship between each drawing. Arrows and other marks (directions) labelled on each drawing do not limit the scope of the present disclosure.

First Embodiment

1. Outline of Object of Production (Pressed Product)

As shown in FIG. 1, a frame 1 is a part of framework of a vehicle seat. The frame 1 in the present embodiment is a side frame of a seatback (not shown in the drawings).

Figure 2:
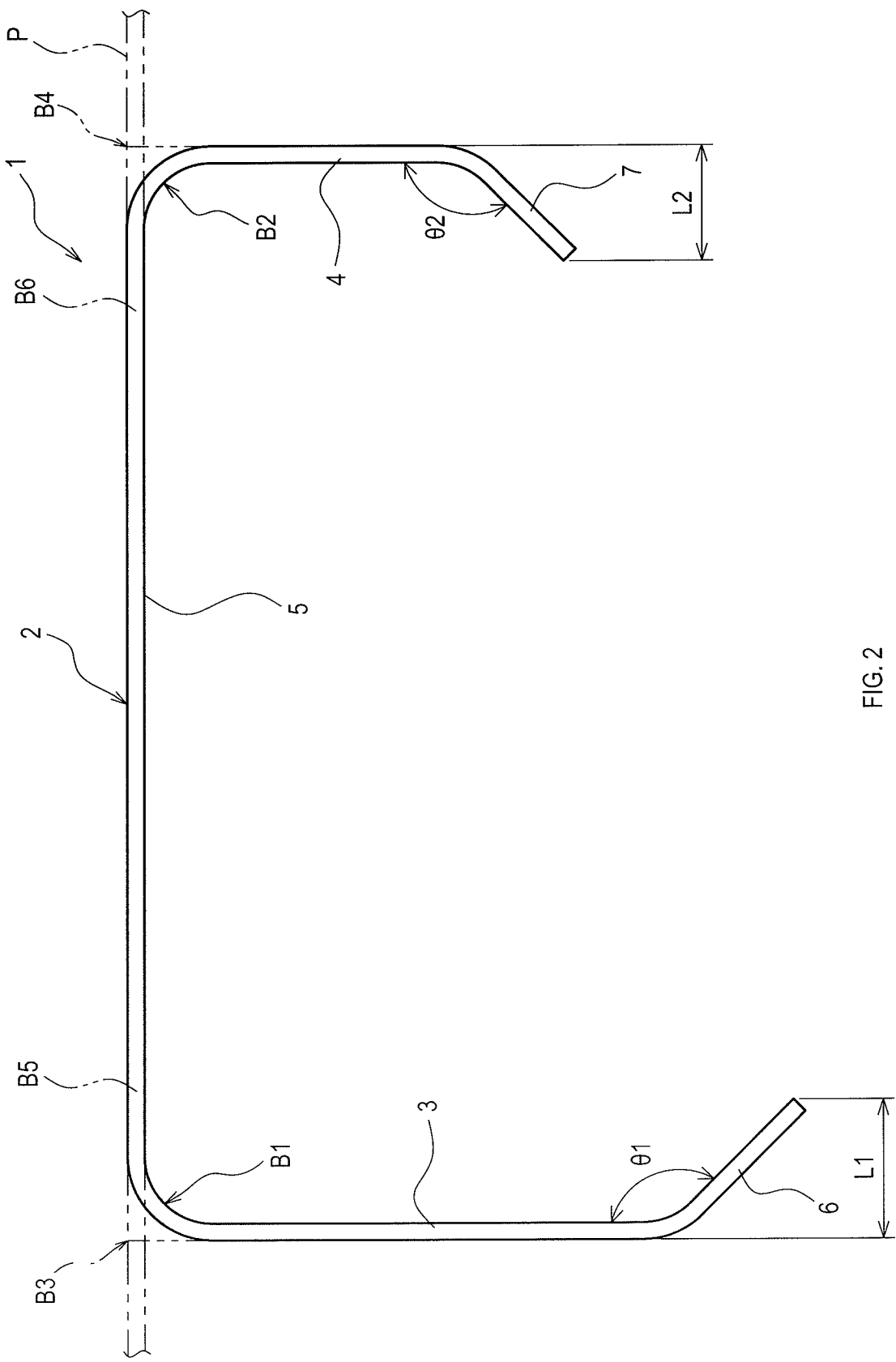
FIG. 2 is a diagram showing the frame according to the embodiment.

The frame 1 is one example of a pressed product molded using a press molding method. In other words, the frame 1 is the pressed product created by press molding, in which a metallic sheet P in FIG. 2 is pressed in a thickness direction of the metallic sheet P and bent.

A cross-sectional shape of the frame 1 comprises at least a substantially U-shaped main body 2, a first undercut flange 6, and a second undercut flange 7.

The main body 2 comprises at least a first plate portion 3, a second plate portion 4, and a third plate portion 5. The first plate portion 3 and the second plate portion 4 are wall-like portions that face each other across a space.

The third plate portion 5 couples the first plate portion 3 with the second plate portion 4 and also is a wall-like portion that extends in a direction perpendicular to a plate surface of the first plate portion 3 and a plate surface of the second plate portion 4 (an orthogonal direction in the present embodiment).

The first undercut flange 6 extends from a first end of the first plate portion 3, situated opposite from the third plate portion 5, towards the second plate portion 4. The second undercut flange 7 extends from a first end of the second plate portion 4, situated opposite from the third plate portion 5, towards the first plate portion 3.

An angle θ1, made by an inner surface of the first undercut flange 6 and an inner surface of the first plate portion 3, and an angle θ2, made by an inner surface of the second undercut flange 7 and an inner surface of the second plate portion 4, may be any angle as long as they are greater than 0° and equal to or less than 90°.

2. Press Molding Method 2.1 Outline of Press Molding Method

The press molding method according to the present embodiment comprises at least a flange molding process and a finishing process.

<Flange Molding Process>

Figure 5:
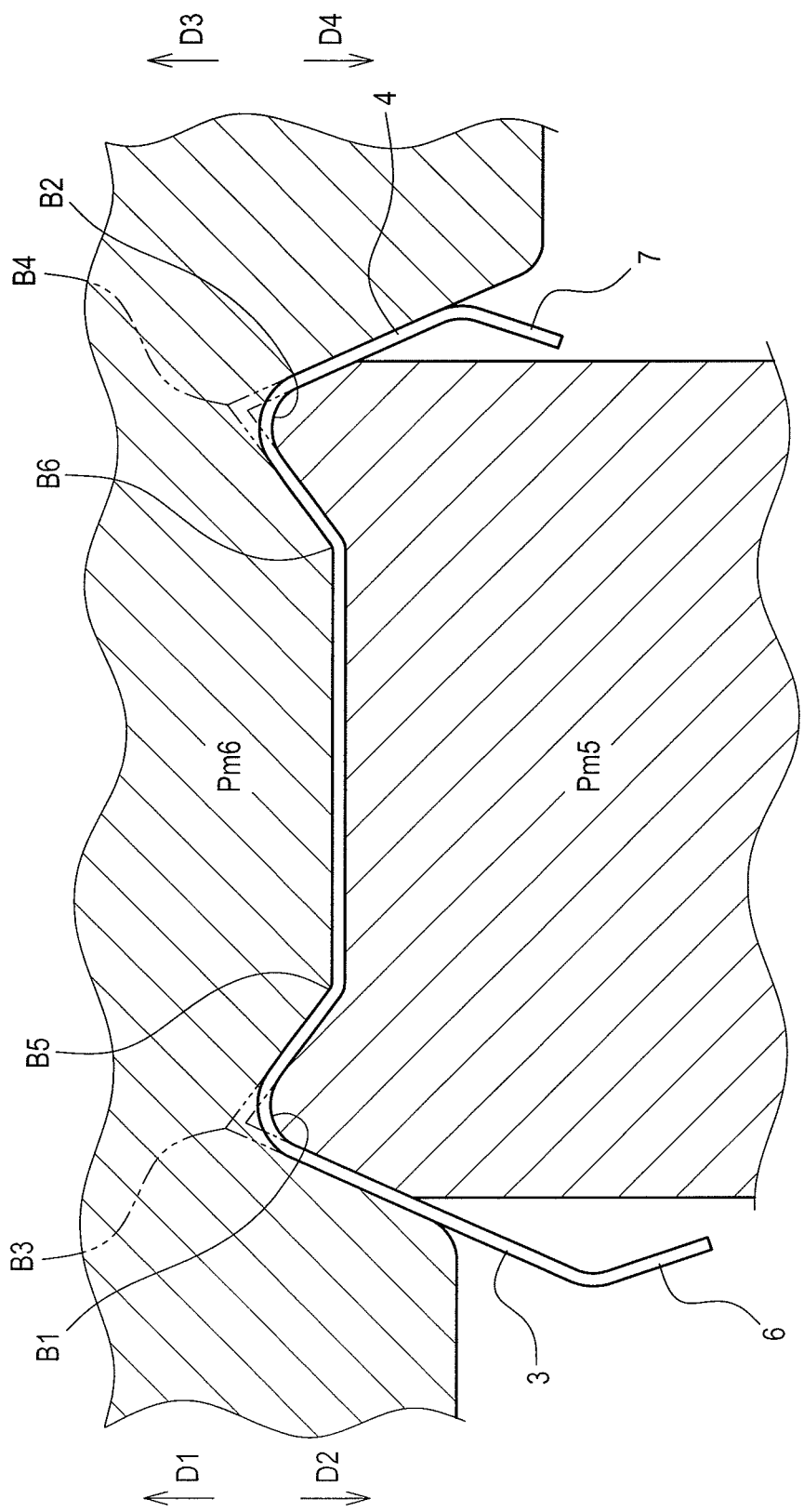
FIG. 5 is an explanatory diagram showing the press molding method according to the embodiment.

In the flange molding process, as shown in FIG. 5, the metallic sheet P is bent to mold the first undercut flange 6 and the second undercut flange 7; and a first bent part B3 and a second bent part B4 of the metallic sheet P are bent to mold the first plate portion 3, a first border B1, the second plate portion 4, and a second border B2.

In the flange molding process, the third bent part B5 is bent such that the first bent part B3 is moved towards a first press direction (D1) and the undercut flange 6 is moved towards a second press direction (D2). The first press direction and the second press direction are opposite to each other. The fourth bent part B6 is bent such that the second bent part B4 is moved towards the third press direction (D3) and the undercut flange 7 is moved towards the fourth press direction (D4). The third press direction and the fourth press direction are opposite to each other.

As shown in FIG. 2, the first border B1 is a boundary between the first plate portion 3 and the third plate portion 5. The second border B2 is a boundary between the second plate portion 4 and the third plate portion 5. The first bent part B3 is situated to correspond to the location of the first border B1 in the metallic sheet P. The second bent part B4 is situated to correspond to the location of the second border B2 in the metallic sheet P.

On the metallic sheet P, the third bent part B5 is situated away from the first bent part B3 towards the second bent part B4 along the sheet surface by a first length L1 or more. The first length L1 is the length from a boundary between the first undercut flange 6 and the first plate portion 3 to a tip of the first undercut flange 6. The first length L1 is sized by projecting the first undercut flange 6 on a first imaginary surface orthogonal to the first plate portion 3.

On the metallic sheet P, the fourth bent part B6 is situated away from the second bent part B4 towards the first bent part B3 along the sheet surface by a second length L2 or more. The second length L2 is the length from a boundary between the second undercut flange 7 and the second plate portion 4 to a tip of the second undercut flange 7. The second length L2 is sized by projecting the second undercut flange 7 on a second imaginary surface orthogonal to the second plate portion 4.

In FIG. 2, the point of intersection between a line extending from the first plate portion 3 and a line extending from the third plate portion 5 is shown as the first bent part B3; the point of intersection between a line extending from the second plate portion 4 and the line extending from the third plate portion 5 is shown as the second bent part B4.

In the press molding, the metallic sheet P is plastically deformed with a stretch when being bent. In addition, each of the first border B1 and the second border B2 needs to have a radius of curvature that is enough to avoid a fracture of the metallic sheet P at the time of press molding (at the time of bending) or greater.

Accordingly, the location of the first bent part B3 and the location of the second bent part B4 are not limited to those shown in FIG. 2. Similarly, the location of the third bent part B5 and the location of the fourth bent part B6 are not limited to those shown in FIG. 2.

In other words, in an event that the location of the first bent part B3 is not the same as the location shown in FIG. 2, the third bent part B5 may be situated away from the first bent part B3 by less than the first length L1. Similarly, in an event that the location of the second bent part B4 is not the same as the location shown in FIG. 2, the fourth bent part B6 may be situated away from the second bent part B4 by less than the second length L2.

<Finishing Process>

The finishing process is carried out after completing the flange molding process. Specifically, the finishing process is for finishing the frame 1 by shaping the metallic sheet P, molded in the flange molding process, into the frame 1.

2.1 Detail of Press Molding Method

A press molding method according to the present embodiment basically proceeds the bending work on the metallic sheet P as shown in FIG. 3, FIG. 4, FIG. 5, and FIG. 6 in this order. The flange molding process comprises at least a preflange molding process (see FIG. 3), a flange bending process (see FIG. 4), and a boundary molding process (see FIG. 5).

<Preflange Molding Process>

Figure 3:
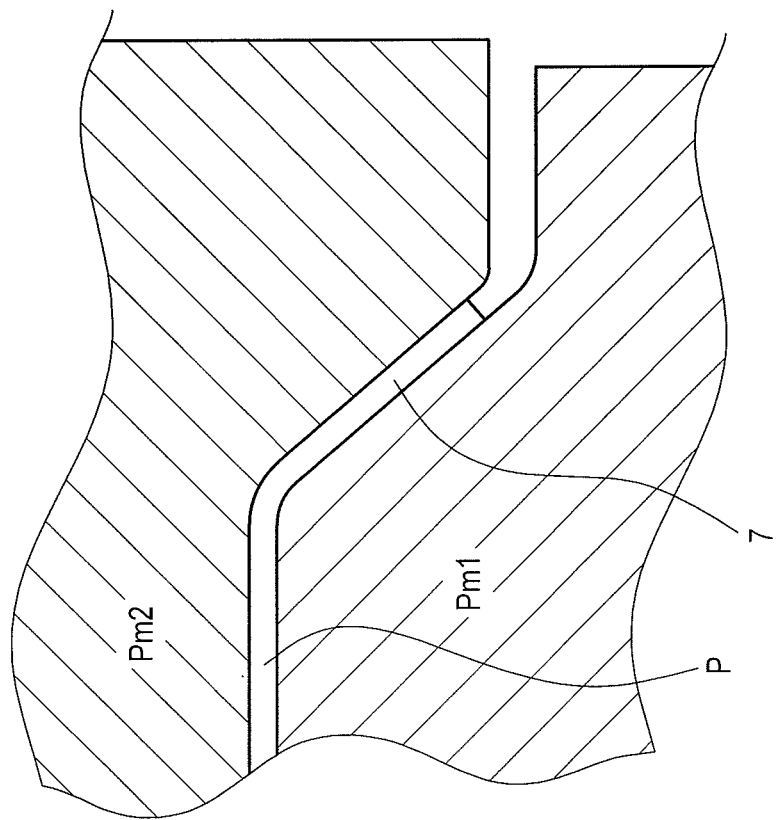
FIG. 3 is an explanatory diagram showing press molding method according to an embodiment.
Figure 3:
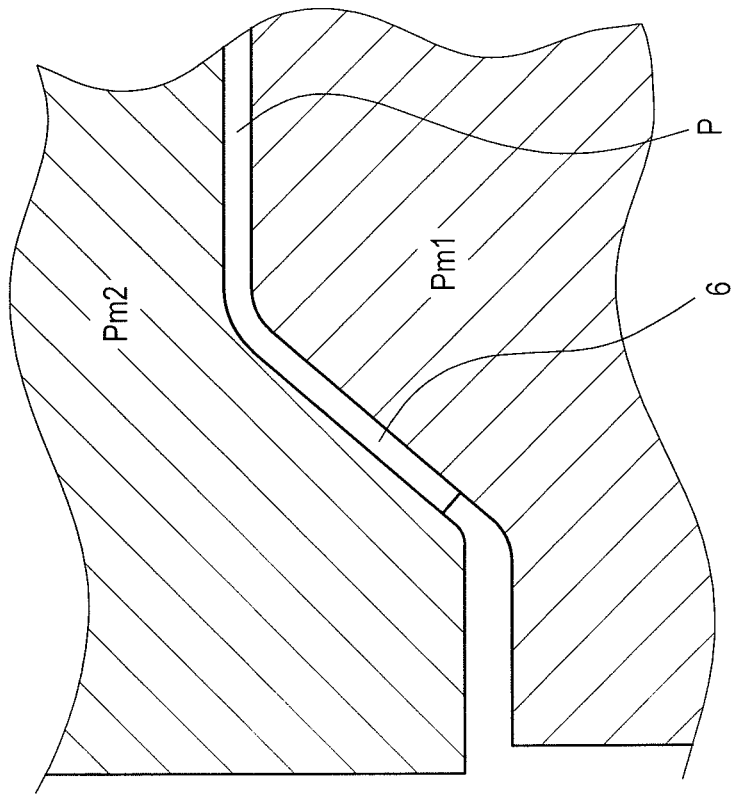
Figure 4:
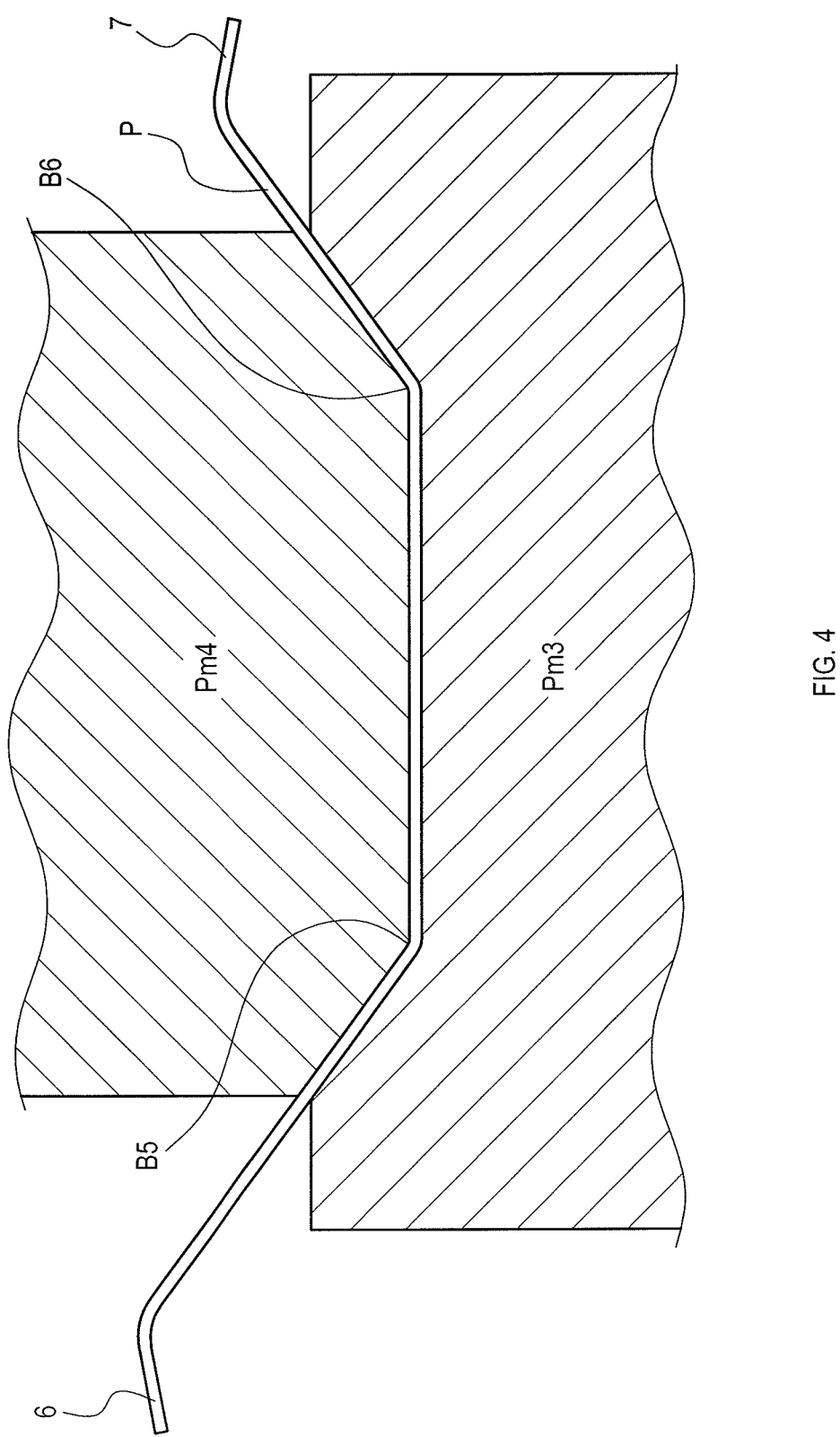
FIG. 4 is an explanatory diagram showing the press molding method according to the embodiment.

In the preflange molding process shown in FIG. 3, the plane plate-like metallic sheet P is bent to mold the first undercut flange 6 and the second undercut flange 7. A press used to carry out the preflange molding process comprises press metallic molds Pm1 and Pm2 that press the plane plate-like metallic sheet P in the thickness direction.

<Flange Bending Process>

The flange bending process is carried out after completing the preflange molding process. In the flange bending process shown in FIG. 4, the third bent part B5 and the fourth bent part B6 are bent. A press used to carry out the flange bending process comprises press metallic molds Pm3 and Pm4 that press the metallic sheet P in the thickness direction.

<Boundary Molding Process>

The boundary molding process is carried out after completing the preflange molding process. In the boundary molding process shown in FIG. 5, the first bent part B3 is bent to mold the first border B1, and the second bent part B4 is bent to mold the second border B2. A press used to carry out the boundary molding process comprises press metallic molds Pm5 and Pm6 that press the metallic sheet P in the thickness direction.

<Finishing Process>

Figure 6:
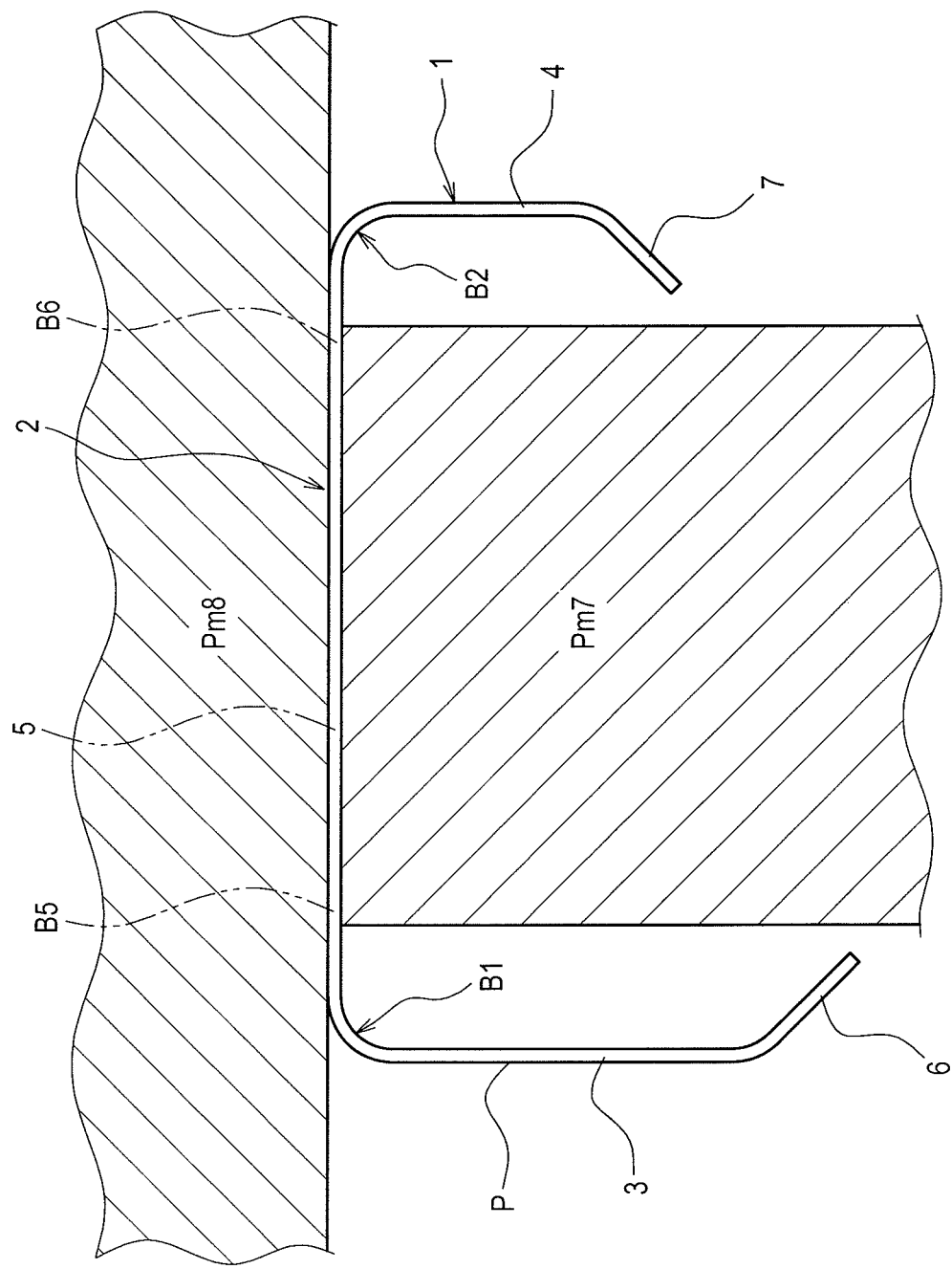
FIG. 6 is an explanatory diagram showing the press molding method according to the embodiment.

The finishing process shown in FIG. 6 comprises a flange reversing process to eliminate bent shapes of the third bent part B5 and the fourth bent part B6 and mold the third bent part B5 and the fourth bent part B6 into a plane plate. A press used to carry out the flange reversing process comprises press metallic molds Pm7 and Pm8 that press the metallic sheet P in the thickness direction.

3. Feature of Press Molding Method in Present Embodiment

The press molding method in the present embodiment basically proceeds the bending work on the metallic sheet P as shown in FIG. 3, FIG. 4, FIG. 5, and FIG. 6 in this order. Accordingly, a person who manufactures the frame 1 can eliminate an angle modification process.

More specifically, in the press molding method according to the present embodiment, an interference of the press metallic molds Pm5, Pm7, and the like on the first undercut flange 6 and the second undercut flange 7 is avoided without comprising the angle modification process by means of molding the substantially U-shaped main body 2 after molding the first undercut flange 6, the second undercut flange 7, the first border B1, and the second border B2.

Accordingly, the first length L1 and the second length L2 are sized such that the interference of the press metallic molds Pm5, Pm7, and the like on the first undercut flange 6 and the second undercut flange 7 can be avoided.

The flange reversing process leaves shock lines on the third bent part B5 and the fourth bent part B6 in the third plate portion 5. In other words, the presence of a shock line indicates that the flange molding process was carried out.

Other Embodiment

The aforementioned press molding method may also be applied to the frame 1 that does not comprise a second undercut flange 7.

The aforementioned press molding method may also be applied to any other component as long as the component comprises an undercut flange and a substantially U-shaped main body.

The press molding method according to the aforementioned embodiment may also be applied not only to a method of press molding two or more frames 1 consecutively in a progressive press line, but also to those methods of press molding not carried out in the progressive press line.

The present disclosure is not limited to the aforementioned embodiments as long as it falls within the spirit of the invention described in the claims. Accordingly, the present disclosure may be configured in combination of at least two of the aforementioned embodiments.

What is claimed is:

1. A method of manufacturing a pressed product, the pressed product comprising:
   a substantially U-shaped main body comprising a first plate portion and a second plate portion facing each other across a space, and a third plate portion coupling the first plate portion with the second plate portion and extending towards a direction orthogonal to a plate surface of the first plate portion and a plate surface of the second plate portion; and
   an undercut flange extending from an end of the first plate portion towards the second plate portion, the end of the first plate portion being situated opposite from the third plate portion,
   the method comprising:
   at least a flange molding process and a finishing process;
   the flange molding process comprising bending a metallic sheet due to a pressure applied to the metallic sheet in a thickness direction of the metallic sheet and molding the undercut flange, and bending a first bent part corresponding to a first border that is a boundary between the first plate portion and the third plate portion of the metallic sheet, and a second bent part corresponding to a second border that is a boundary between the second plate portion and the third plate portion of the metallic sheet, to mold the first plate portion, the first border, the second plate portion, and the second border, and
   the finishing process comprising finishing the pressed product by shaping the metallic sheet, molded in the flange molding process, into the pressed product,
   wherein, in the flange molding process, a third bent part, which is situated away from the first bent part towards the second bent part on the metallic sheet by a first length or more, is bent such that the first bent part is moved towards a first press direction and the undercut flange is moved towards a second press direction,
   wherein the first press direction and the second press direction are opposite to each other, wherein the first length is a length from a boundary between the undercut flange and the first plate portion to a tip of the undercut flange, the first length being sized by projecting the undercut flange on an imaginary surface orthogonal to the first plate portion, and wherein the third bent part is provided between the first bent part and the second bent part along a sheet surface of the metallic sheet.

2. The method of manufacturing the pressed product according to claim 1, wherein the finishing process comprises a flange reversing process to eliminate bent shape of the third bent part and mold the third bent part into a plane plate.

3. The method of manufacturing the pressed product according to claim 1, wherein the flange molding process comprises at least
   a preflange molding process, in which the metallic sheet is bent to mold the undercut flange, and
   a boundary molding process, in which the first bent part is bent to mold the first border, and
wherein the boundary molding process is carried out after completing the preflange molding process.

4. The method of manufacturing the pressed product according to claim 3, wherein the flange molding process comprises at least a flange bending process, in which the third bent part is bent, and wherein the flange bending process is carried out after completing the preflange molding process.

5. The method of manufacturing the pressed product according to claim 4, wherein the flange bending process is carried out after completing the preflange molding process and before initiating the boundary molding process.

* * * * *